March 22, 1960     C. N. CRESAP     2,929,109
METHOD FOR MOLDING PULVERULENT MATERIAL
Filed Dec. 30, 1954     2 Sheets-Sheet 1
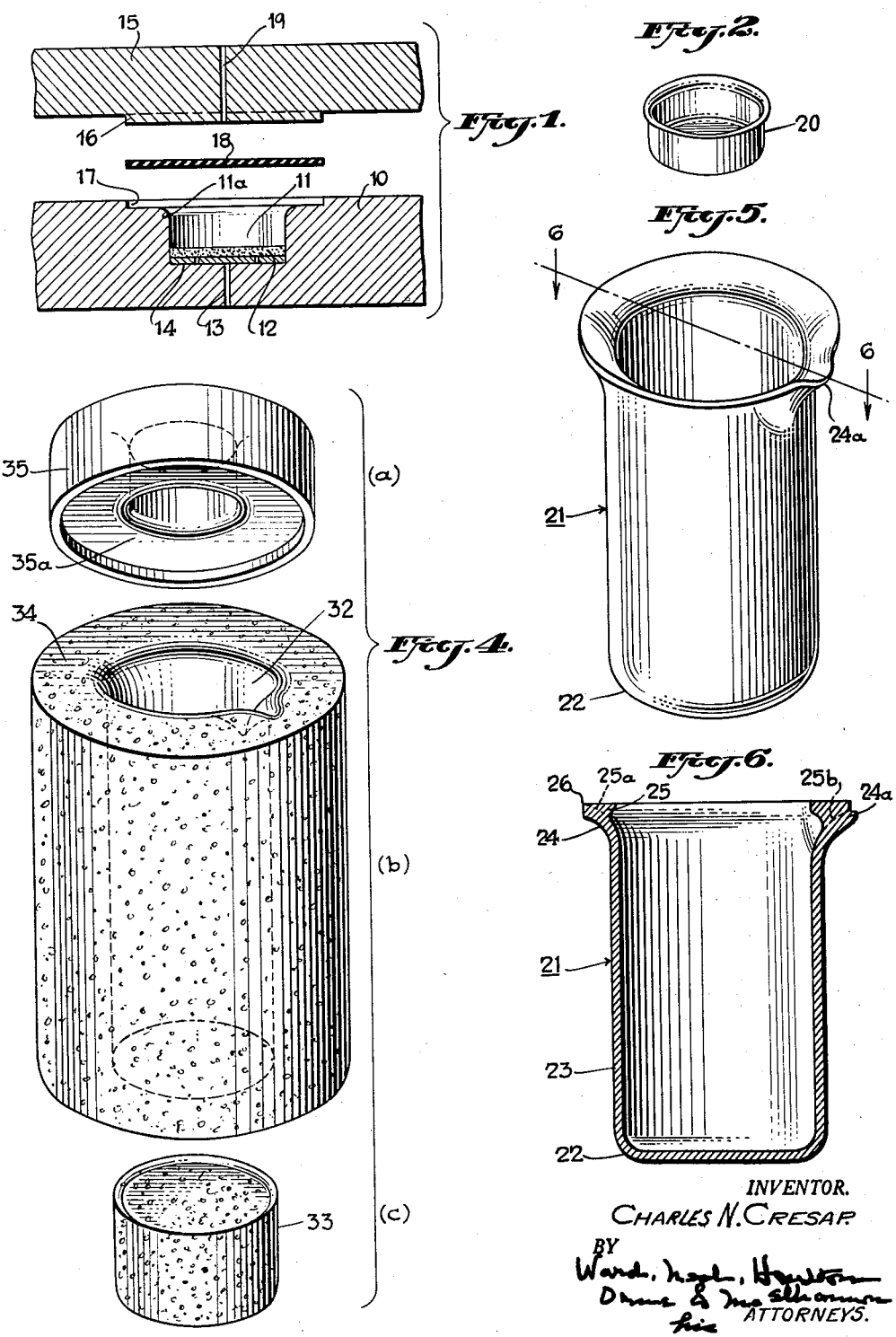
INVENTOR.
CHARLES N. CRESAP
BY
ATTORNEYS.

March 22, 1960 C. N. CRESAP 2,929,109
METHOD FOR MOLDING PULVERULENT MATERIAL
Filed Dec. 30, 1954 2 Sheets-Sheet 2

INVENTOR.
CHARLES N. CRESAP
BY
ATTORNEYS.

United States Patent Office 2,929,109
Patented Mar. 22, 1960

2,929,109
METHOD FOR MOLDING PULVERULENT MATERIAL

Charles N. Cresap, Scarsdale, N.Y.

Application December 30, 1954, Serial No. 478,623

2 Claims. (Cl. 18—55)

This invention relates to the fabrication of linear polymeric powders such as polytetrafluoroethylene into complex or irregular shapes of uniform density, such powders having the property of deforming under load and slowly and incompletely recovering after the load is removed. Polytetrafluoroethylene is hereinafter sometimes referred to as Teflon.

Although Teflon powders have now been available for many years, no method has heretofore been suggested for quickly and inexpensively forming therefrom objects of complex or irregular shape and of uniform density.

It has been necessary in the past, where complex pieces of the aforementioned material have been required, to machine such pieces from bar or sheet stock, which procedure is expensive and time consuming to such a degree that the end product is severely restricted as to its commercial market.

Although fairly complex shapes of Teflon can be formed by sealing together various spun, extruded and/or sheet components, the assembly of such components involves considerable labor, and especially shaped and expensive heat and pressure fixtures. Furthermore, present day commercial sheet and moldings, even of the best quality, often contain undesirable bubbles and pinholes. Also, the end products produced thereby have been substantially limited in complexity, are particularly sensitive to defects in workmanship, do not hold their shape when heated, involve substantial wastage of material, and in general are of substantially inferior quality as compared to seamless products produced according to my invention as set forth below.

One of the objects of the present invention is to provide novel method for rapidly and inexpensively forming irregularly shaped articles from Teflon powder, which articles, for example, may be of substantially hollow character having solid walls of uniform density, free of bubbles and pinholes. Such articles when properly compressed are quite strong and may be handled without injury prior to sintering.

A further object is to provide novel method for forming hollow articles of the above character having thin and seamless walls.

A further object is to provide novel method for forming hollow articles of the above character, certain wall portions of which are perpendicular to other wall portions.

My invention in one aspect thereof is constituted by the method of forming irregularly shaped substantially hollow articles from pulverulent Teflon material, such articles being free of pinholes and bubbles and having walls of uniform density, and which method consists in: placing such pulverulent material between a membrane of thin rubber-like or elastomeric substance and a die so that the compression of the powder may be effected in a partial or complete vacuum. Often, it is desirable, in order to facilitate the removal of gases, to construct the die at least partially of a porous material such as compressed sintered powdered metal. Thereafter, the membrane is subjected to a high fluid pressure to compress the pulverulent material between the membrane and the die until adjacent particles of the material coalesce and adhere to one another. Thereafter the aforementioned high fluid pressure is removed, and the compressed powder now forming the strong readily handled article is disengaged from the die. Such article thereafter is sintered by subjecting same to heat for a selected period.

In order to practice the invention suitable apparatus is used including mold means adapted with suitably connected channels and passages to be evacuated before or during compression, as for example by constructing the die in full or in part of a hard porous material. A deformable membrane is provided of rubber-like material which is adapted to be deformed under high fluid pressure in such a manner that it enables the fluid pressure to act in a direction normal to the surfaces of the mold. The marginal edges of the membrane are secured in fluid-tight engagement to the aforementioned mold means. Such mold means and the membrane are, of course, adapted to receive therebetween the aforementioned powdered material. Means are provided for controlling the passage of gases through the aforementioned passages or porous material of the mold whereby the powdered material is compressed either in a vacuum or in a controlled gaseous atmosphere as desired. Means are also provided for subjecting such membrane to the high fluid pressure thereby to compress the powdered material and cause same to follow the contours of the mold.

The above and further objects will more fully appear from the description set forth below taken in connection with the accompanying drawings which form a part of this application, it being understood, however, that the invention is not limited to such drawings, the latter being for illustrative purposes only.

In the drawings:

Fig. 1 is a side elevation, partly in section and with parts broken away, of one form of novel apparatus used for carrying out the novel methods;

Fig. 2 is a perspective view of an article molded in the apparatus of Fig. 1;

Fig. 3 is a side elevation, also partly in section and with parts broken away, illustrating in exploded relationship the various elements of another form of novel apparatus used for carrying out the novel method;

Figure 5:
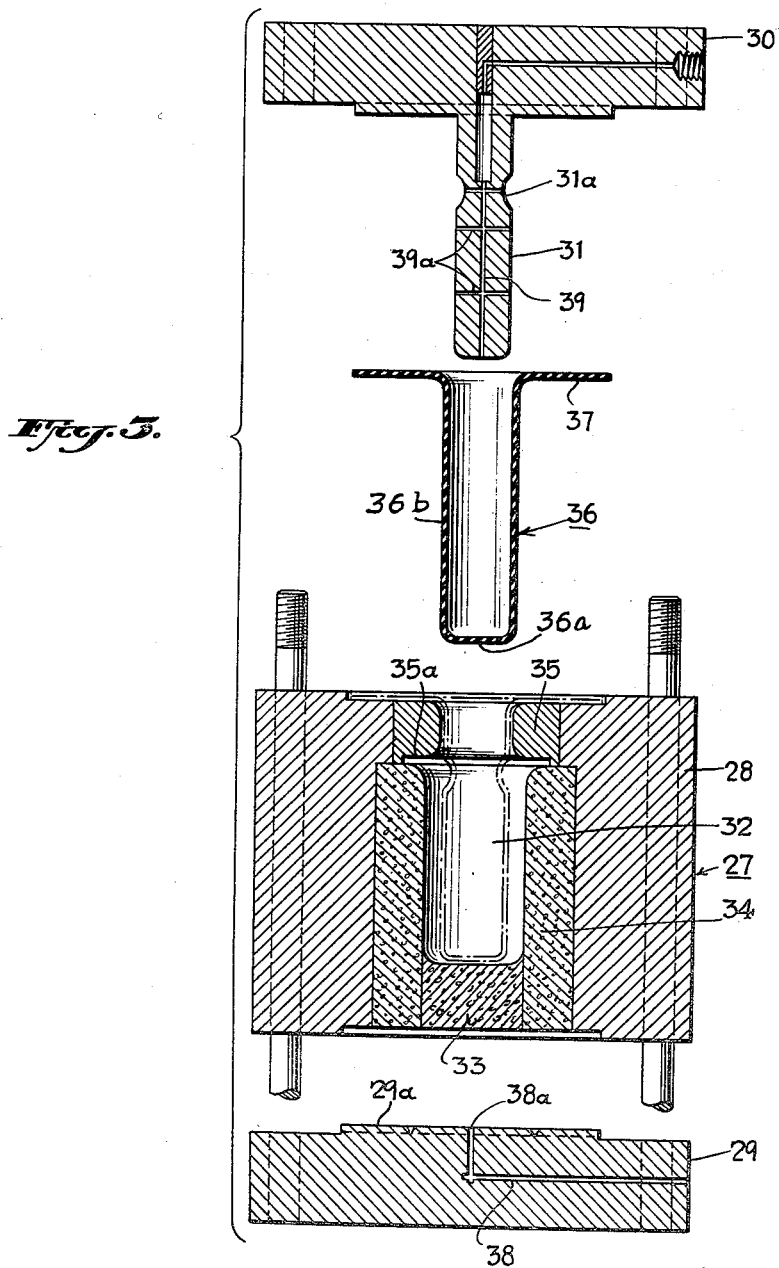

Figs. 4a, b and c illustrate several separable elements of a porous liner which define the mold surfaces of the mold or die shown in Fig. 3;

Fig. 5 is a perspective view of a beaker molded in the apparatus of Fig. 3; and

Fig. 6 is a sectional view taken substantially along line 6—6 of Fig. 5.

Referring to the drawings in greater detail, there will now be described the novel method for producing particularly thin walled seamless moldings, for example beakers, of compressed Teflon powder, such moldings being of substantially complex or irregular shape.

I have discovered that by interposing the aforementioned Teflon powder between an elastomeric membrane and a die or mold surface and subjecting such membrane to high fluid pressure, the powder will be compressed and can be formed into readily handleable shapes of the highest complexity. Furthermore, the articles so produced from such compressed powder are of uniform density throughout, free of pinholes and are quite strong. By virtue of the employment of such a membrane having to a high degree deformability, collapsibility, and the ability to elongate, such articles of complex shape can be molded with ease and at relatively low cost. The membrane or diaphragm of rubber-like material need not be constructed in shape having a complexity which is the same as or near the complexity of the rigid mold or die face against which the diaphragm transmits fluid pressure via the aforementioned pulverulent or powdered material. By virtue of the deformability of the membrane, the high fluid pressure applied thereto will cause same to assume the shape of the substance against which it is exerting pressure and without rupture or failure. If it is so desired, such shapes of membrane and die can be made substantially to approximate one another. Frequently it will be useful in achieving a desired thickness everywhere throughout a complex piece to increase the charge in special areas or places by designing more free volume at such places or precompressing the charge there in order to provide the increased weight of charge at locations where increased workpiece volume is desired.

Reverting to Fig. 1, the novel apparatus is constituted by a mold or die plate 10 having formed therein a recess 11 for receiving the powder. The upper edges 11a of the recess are rounded in order to eliminate sharp edges that might abrade or cut the diaphragm. For the purpose of controlling the flow of gases from the mold cavity, a porous disc-like element 12, for example, of unglazed porcelain or of compressed sintered powdered metal, is positioned as shown and the lower portion of the cavity 11 is placed in communication with the bottom of the mold plate 10 via a channel 13. Such channel thus places the region immediately beneath the disc 12 in communication with the atmosphere or any suitable system for delivering or removing gases. Further, if desired, a perforated steel disc 14 may be interposed between the bottom surface of the cavity 11 and the porous disc 12, the disc 14 having a plurality of perforations therein in order to insure good communication with the channel 13. The perforated steel disc 14 aids in the ejecting of the molded article after the exertion of pressure as will appear more fully hereinafter.

Cooperating with the base mold plate 10 is a cover plate 15 which is adapted to be bolted down upon such base mold plate. The cover plate 15 is provided with a raised portion 16 on the lower surface thereof which is proportioned for the purpose of registering with and fitting within a recess 17 of corresponding shape formed about the upper margin of the recess 11. The recess 17 is thus generally of annular shape and is designed for the purpose of receiving a deformable membrane 18 of rubber or rubber-like material. When the cover plate 15 thus is tightly secured in position closely adjacent to the mold plate 10 with the deformable membrane 18 in position, the margin of such membrane thus is held in fluid-tight engagement with the mold. Membrane 18, in this form of the invention, is initially substantially flat.

The undersurface of the raised portion 16 aforementioned is in communication with its opposite surface by a passage 19 which is in function analogous to the aforementioned passage 13.

After the porous disc 12 and the perforated disc 14 are positioned, as shown in Fig. 1, the recess or cavity 11 is then loosely filled with Teflon powder. The membrane 18 is centered over the recess 17, and the cover plate 15 is secured tightly against the base mold plate 10 with the raised portion 16 pressing the margins of the membrane 18 between it and the floor surfaces of such recess. Thereafter any gases (below the membrane 18) are exhausted from the cavity 11 via the passage 13. That is, at least a partial vacuum is applied to such cavity via the passage 13. Alternatively, gases may be introduced into such cavity for special purposes where desired instead of withdrawing gases.

After subjecting the cavity 11 to the aforementioned vacuum for a selected period, such as a few minutes, the upper surface of the membrane 18 is subjected to fluid under high pressure. For example, nitrogen compressed to about 2250 p.s.i. or more is directed to the upper surfaces of the membrane 18 via the channel 19. The fluid pressure is permitted to remain upon the membrane 18 for a selected period, for example, one or two minutes, whereupon such pressure and such vacuum are relieved and the mold plates separated. The molded article can be ejected from the mold or die by thrusting or tapping a rod against the plate 14 via the channel or passage 13. The molded article comprises, in the form shown, a circular shallow dish 20, as indicated in Fig. 2. The article 20 thereafter is sintered by subjecting same to heat to a selected degree and for a selected period. For example, the article may be immersed in a molten salt bath for approximately one hour at, for example, 700° F.

The aforementioned membrane or diaphragm 18 may be of natural rubber or, for example, of synthetic rubber, such as neoprene, or of other suitable rubber-like or elastomeric material.

Referring now to Fig. 3, the novel method and apparatus will now be described for molding a complex shaped article, such as a beaker shown in cross-section in Fig. 6. The aforementioned beaker is designated generally by the numeral 21 and is provided with: rounded corners 22 upon the flat bottom thereof, cylindrical walls 23, and an outwardly flared or flanged upper portion 24 having a faired pouring spout 24a.

If desired, an annulus or ring 25 of substantially rectangular cross-section can be formed around the mouth of the beaker 21, the outer edge of which is shown at 26.

If, for example, an outwardly flared upper inner mouth surface is desired on the beaker, the ring 25 can be trimmed by a relatively easy and rapid machine cutting operation to the form selected, the extent of machining being relatively small. As shown in Fig. 5 the ring 25 is trimmed down to the broken lines 25a and 25b, the latter defining the bottom of the faired pouring spout. Of course, such reducing of the ring 25 is not always necessary unless special shaping of the mouth or lip cross-section is desired. I have found it desirable initially to locate an excess of the powder in the mold around the edge or mouth region of the work piece in order to produce a relatively thick lip (e.g., the ring 25) which can be reduced as desired by any suitable type of trimming operation.

As shown in Fig. 3, a mold generally designated by the numeral 27 is shown consisting of a mold body 28, a bottom plate 29, a cover plate 30 to which is secured a center plug (or membrane form) 31 for insertion into mold cavity 32. The mold or die surfaces which define the outer contours of the beaker 21 (Figs. 5 and 6) are formed by such inner liner elements, as shown in exploded view in Fig. 4, and individually designated as a bottom plug 33, hollow cylinder 34, and upper ring 35. Liner elements 33 and 34 are, in one form of the invention, of porous substance, such as compressed powdered metal, and perform a function analogous to the porous unfired porcelain element 12 of Fig. 1. Normally it is not necessary for ring 35 to be of such porous material.

It is, of course, against the inner surfaces of the elements 33, 34, 35 that the powdered material is pressed by means of an expandable membrane of elastomeric material 36 which, in this form of the invention, is generally of bag-like configuration but is provided with an upper flange 37 analogous to the margin of the diaphragm 18.

The membrane 36, being of such bag-like configuration, has a bottom portion 36a which, either before and/or during the application of fluid pressure, is at right angles to or substantially perpendicular to the side portions 36b thereof. This insures simultaneous multidirectional application of the full value of the pressure upon such perpendicular surfaces despite their perpendicularity.

The aforementioned elements 33, 34 and 35, for example, may be of a substance known as degreased porous bronze.

A passage 38 is formed in the bottom plate 29 interconnecting the lower portion of the bottom plug 33 with an outside surface of such bottom plate 29. Passage 38 is analogous in function to the passage 13 of Fig. 1. Also there is preferably formed longitudinally through the center plug 31 a passage 39 and interconnecting transverse passages 39a which also serve a purpose analogous to that of the passage 19 of Fig. 1. That is, gases may be introduced in or removed from the regions in communication with such passages 38, 39, and 39a.

The cylindrical liner portion 34, when the apparatus is assembled, is positioned within the mold body 28 by a press fit. Thereafter the rubber-like membrane or diaphragm 36 is placed over the center plug 31 and a vacuum is applied to the channels 39, 39a thereby to compel the membrane 36 to conform to the outer shape of the plug 31. The latter may be provided with an annular recess at 31a extending around the neck thereof for the purpose of permitting the insertion at a later time of a selected extra volume of Teflon powder and at a special place in the mold when the plug and membrane are inserted into the mold cavity as will appear more fully below.

Thereafter the ring 35 is inserted over the diaphragm and the center plug 31 with the face 35a thereof facing downwardly, as viewed in Fig. 3, that is, facing the lower end of the membrane 36 when in position. Thereafter the cover plate 30 is bolted in place to the top surface of the mold body 28 thereby securing the flange 37 of the membrane into fluid-tight engagement with the mold means. This may be done, for example, without removing the vacuum or partial vacuum to which the passages 39, 39a are subjected.

The bottom plug 33 thereafter may be removed if it is in its normal position in the mold and the mold can be turned to an attitude wherein the plate 30 is on the bottom and mold cavity 32 is exposed for the reception of the pulverulent material to be compressed. Thus with the mold upside down and the cavity open, the Teflon powder is placed in the mold cavity between the membrane 36 and the surfaces of the porous elements 34 and 35. I have found that the internal configuration of the beaker can be varied to a substantial degree depending on how the powder is charged into the cavity and also upon the shape of the membrane when initially compelled to follow the shape of the centering plug 31 as by the aforementioned vacuum. Such amount of powder is filled in which is sufficient to cover the end of the diaphragm to a sufficient depth to form the bottom of the beaker, as is well shown in Fig. 6. Thereafter the bottom plug 33 is inserted, as in Fig. 3, and the plate 29 is secured in place, for example, by tightly bolting same to the mold body 28. The vacuum then is removed from the channel 39 and applied to the channel 38 thereby subjecting the mold cavity to vacuum or at least a partial vacuum and thus removing gaseous substances in the mold cavity and in the porous elements 33 and 34.

A high fluid pressure then is applied to the interior surfaces of the membrane or diaphragm 36, for example, 2250 p.s.i. Such fluid pressure is permitted to persist for a selected period, for example, one or two minutes at peak value. Thereby the powdered Teflon is greatly compressed and the thin walled complex article of Fig. 6 is formed. The aforementioned high fluid pressure and vacuum are thereafter relieved and the vacuum is applied again to the channel 39 to assist in removing the molded article. If desired the vacuum can be removed from channel 38 before and during such application of fluid pressure. The elements 30, 31 and 36 then may be removed from the main mold body after releasing the means securing same thereto, whereupon the molded beaker with the mold ring 35 still in place may be withdrawn. The molded article usually is withdrawn therewith while still on the centering plug 31 and the membrane 36 from which it can be easily detached.

Thereafter a sintering step occurs analogous to that above mentioned in connection with Fig. 1 wherein the molded beaker is subjected to a molten salt bath at, e.g., 700° F., for example, for about one-half hour.

Then if desired, the annular rib 25 can be trimmed off, as by machining as aforementioned, and the pouring spout 21a also can be trimmed and faired. If desired, the beaker surfaces, particularly on the diaphragm side, then can be polished to obtain a desired finish.

In order to produce in the finished molded article in the upper mouth region thereof (Fig. 6) a continuous section of adequate thickness to enable such trimming, particularly the flared lip, the rib 26, and the faired pouring spout 21a as aforementioned, I have found it desirable to provide a surplus of compressible powdered material in such region. This can be aided by forming the above-described annular recess 31a in the neck of the centering plug 31 and in precompressing same as by tamping down by hand or by, e.g., hydraulically driven tamping means including, for example a sleeve press element. In general, sufficient volume of powdered material must be provided (not subjected to such precompression) in order that such relatively loose powder at every level and location of the mold produces a selected weight of material thereby to produce the selected finally compressed volume at every location throughout the molded article.

Furthermore, I have found it desirable to employ an augmenting procedure comprising the subdivision of the charge of pulverulent material into a plurality of separate and smaller sub-charges which, with respect to the beaker mold of Fig. 3 are in the order of insertion respectively 16%, 9%, 43% and 32% (by weight).

The 16% portion is first added to the empty mold and before adding the next or 9% portion the first is manually compressed by, for example, forcing a ring down and around the diaphragm and against the powdered material. The second portion of the charge is treated similarly. However, the third portion and fourth (final) portion are loosely added without such manual precompression. By such measures it has been possible to produce a section having any desired thickness in the upper flared region.

By adding relatively more or less powder by weight in selected locations in the mold, it is possible to form internal rings, convex or concave regions, protrusions or bumps at selected places.

It is possible to attach small metallic pieces of selected shapes to the diaphragm in order to impress selected marks upon the molded article.

In general the protrusions and depressions which are produced by the above method will be gently curved.

The novel method is also particularly well adapted for the formation of such complicated shapes of polytetrafluoroethylene as corrugated tubing. Such corrugated tubing of this particular material has never been heretofore cheaply or quickly fabricated. For example, such tubing of this material if desired in the past has had to be formed by machining same from a solid block of the compressed substance. In the compressing of such powder to form such corrugated tubing, it is possible to employ the above-mentioned cup-like elastomeric membrane which may have fluid pressure exerted interiorly thereof for forcing same outwardly to press the powdered material into the corrugations of a hard corrugated mold and alternatively the elastomeric membrane can be compressed inwardly by fluid pressures exterior thereto to urge the powder inwardly toward a central hard corrugated mold, it being understood of course that the material forming such central corrugated mold is removable from the molded product by any suitable means as by melting same or by mechanically collapsing same.

Furthermore, such corrugated tubing or other complicated shape, in a separate and non-analogous embodiment, can be molded by means of an elastomeric type of membrane which in itself is generally of corrugated tube-like configuration and which, for example, may have flanges on the two opposite ends. Such generally hollow tube-like elastomeric membrane can be subjected to either external or internal pressures, depending upon the conformation of the hard mold means employed therewith.

There is thus provided novel method and apparatus for forming irregularly shaped and complex articles quickly and inexpensively from pulverulent polytetrafluoroethylene material. Such articles can be molded to comprise thin-walled seamless moldings which are substantially hollow although the invention is not limited to the formation of hollow articles. Such complex shapes are produced with substantial ease and this may be done either in a vacuum or in a controlled gaseous atmosphere. The insertion of such gases into the molding cavity or the withdrawal thereof can be effected either before or during the application of fluid pressure to the membrane.

The mold means, for example, as shown in Fig. 3, can be hermetically sealed, that is, the passage 38 may be closed and the porous metal lining of the mold, despite such sealing, can absorb at least some and possibly all of the gas expelled from the powder during the compression thereof. Gases can be evacuated from the material either before or during the compression of the powder.

The hard porous liner, such as elements 33 and 34 (Fig. 3), thus without the assistance of a vacuum applied thereto is capable of absorbing occluded gas from the powder as the latter is compressed between the membrane and the hard porous material.

The diaphragm or membrane of elastomeric material, although relatively weak in itself (e.g. of $\frac{1}{32}$ inch in thickness), can be subjected to extreme fluid pressures, for example, of the order of many tons per square inch, providing the membrane is restrained throughout its entire area by means of the compressed powder and the surfaces of the mold means. The elastomeric membrane under the force of such fluid is capable of exerting pressure normal to the complicated mold surface at each and every increment of the area thereof, thereby compressing the powder into a homogeneous mass which is strong enough of itself to be handled and further processed without breakage. Furthermore, the uniform density of the molded mass assures that it will hold its shape when sintered. This characteristic is of substantial importance because upon it determines the final accuracy of the molded shapes in view of the fact that sintering must be done in most cases, and in the absence of such uniform density at least parts of the workpiece will tend to warp out of shape.

When the hard compressed sintered powdered metal, or other suitable material, such as the aforementioned sintered liner elements 33 and 34 are subjected to a vacuum for the purpose of evacuating gases within the mold, the pulverulent material, of course, in the mold is prevented from being sucked out of the molding cavity and into the pumping system.

The inflated or distorted elastomeric membrance is, for example, deformable to five or more times its relaxed dimension, and when under pressure is, so to speak, "floating" on the rigid restraining shape against which it is pressed by the high fluid pressure. The shape of the membrane under pressure depends thus not only on the rigid restraining shape against which it is pushed but also on the quantity of powder that is introduced between it and the mold.

In the compressing of the Teflon powder, I have found it advantageous as aforementioned to design the charging space in a particular manner, for example, the recess 31a is formed in the neck of the center plug 31. By particularly controlling the extent of the space in which the powder is to be charged and by, in combination therewith, precompressing a specific portion of the charge of material at such selected places, the wall thickness of the end product (workpiece) can be carefully controlled and, in the form shown, can be increased materially with the effect that the rigid restrained surface may be made to be different in contour from the fluid pressed surface of such workpiece.

Although the description above set forth has been concerned largely with the inflating of an elastomeric membrane from within, whereby it is thrust outwardly, thus compressing the powder between it and the inner surfaces of a generally hollow mold, such embodiment of the invention involving the inflating of the membrane, although it works satisfactorily, is not necessarily preferred over the embodiment wherein the elastomeric membrane is inflated so as to shrink it inwardly over a suitable form or mold embraced thereby. Such suitable form embraced by the membrane and over which it is shrunk, of course, must be suitably rigid in order to withstand the molding pressures and such rigid form must, in order to be removed where undercut or recesses are made therein, be, for example, mechanically collapsible or capable of being melted from the workpiece. When a powder is compressed outwardly, the powder is forced into an increased volume whereby between adjacent volumetric increments of the powder undergoing compression, a tensile force is exerted which is substantially parallel to the surfaces between which the compression is effected. However, where the elastomeric membrane is shrunk over a rigid form with the powder interposed therebetween, the movement, of course, is inward and the forces exerted between adjacent volumetric increments of the powder are thus compressive (as opposed to tensile) and a beneficial condition results from such compressive forces being generally parallel to the surfaces between which the compression occurs. By way of illustration, a metal pipe can be swaged to a greater degree without failure than it can be flared.

In addition to the molding methods above set forth wherein the pulverulent material is pressed against a hard mold surface by means of a rubber-like diaphragm, it is possible, in a different and non-anologous embodiment of the invention, to mold the pulverulent material between two rubber-like membranes or diaphragms having fluid pressures on opposite faces thereof. For example, if it is desired to mold a corrugated tube of polytetrafluoroethylene having transverse corrugations (i.e. a longitudinal tube section showing a somewhat sinusoidal tube wall cross-section), it is possible to employ a primary tubular membrane of rubber-like material which is corrugated in the desired form and which is designed for cooperating with an inner tubular membrane which may have similar corrugations therein. Both the inside of the inner tubular membrane and the outside of the outer tubular membrane can be subjected to high fluid pressure in order to compress the pulverulent material therebetween and form same into the desired corrugated tubing. For example, such membranes with the powder interposed therebetween can be placed in a pressure vessel and subjected to high fluid pressures. The ends of the two tubular shaped membranes, of course, should be suitably associated to prevent the entrance of the pressure fluid therebetween.

In order to aid in adequate and accurate positioning of the powder in between the corrugated elastomeric tubes before pressing the powder therebetween, the following can be employed:

The inner corrugated mold tube can be positioned within the outer corrugated mold tube with the corrugations thereof accurately aligned, and while vibrating both of the tubes the powder can be poured therebetween, for example, from the top while such tubes are generally vertical. Alternatively, the inner corrugated mold tube can be replaced by one that is substantially cylindrical and initially without corrugations and can be held upon a suitable inner cylindrical form somewhat analogous to the above-mentioned center plug 31. Exterior to and embracing the inner mold tube in sliding frictional engagement therewith, there may be employed a sleeve of suitable material, such as metal or suitable plastic such as Teflon. So long as such outer sleeve covers the elastomeric mold inner tube, the latter is unable to be inflated. However, the sleeve can be progressively withdrawn or pulled off of the inner mold tube and a relatively low fluid pressure exerted interiorly of such tube thereby to permit progressive inflation thereof, the above-described assembly all the while being embraced by the outer corrugated mold tube. As such sleeve is progressively pulled off of the inner mold tube, the pulverulent material can be poured between the two tubes and, if desired, such tubes may be suitably vibrated to aid in the settling of the powder in accurate location in the irregular corrugated volume between the tubes. The employment of this procedure is designed to overcome the serious problem of insuring that the powder is adequately located in the corrugations of the mold whereby the desired wall thicknesses of the corrugations may be obtained. After the powder has been thus accurately positioned in the corrugations of the mold and urged therein under the influence of the progressively inflated inner mold tube, the aforementioned sleeve is separated from the mold tubes and each pair of adjacent ends of the latter tubes are sealed or clamped together to prevent the entrance of fluid under pressure. Thereafter the fluid pressure producing the aforementioned inflation of the inner tube during filling of the powder, can be increased while contemporaneously subjecting the outer surfaces of the outer corrugated mold tube to equal fluid pressure. Thus it is possible to eliminate the need for expensive metallic molds. Each of the two corrugated tubes above described can have one of its ends closed by tube material integral therewith, each tube thus being somewhat similar in shape to the membrane 36 of Fig. 3 except for the corrugations.

Reverting to Fig. 3, communication between inner orifice 38a of passage 38 and the porous elements above it can be facilitated by forming shallow grooves in face 29a, e.g., concentric and radial to the center thereof.

While the invention has been described with respect to certain preferred examples, it will be understood by those skilled in the art after understanding the invention that various changes and modifications may be made without departing from the spirit and scope of the invention, and it is intended therefore in the appended claims to cover all such changes and modifications.

What is claimed as new and is desired to be secured by Letters Patent is:

1. The molding of thin walled objects of substantially uniform density and of symmetrical configuration with longitudinal and transverse walls from linear polymeric powder having the characteristics of deformation under load and from which the recovery is slow and incomplete after the load is removed, comprising providing a rigid mold and an elastic inflatable member, assembling the same in the desired relationship with a space therebetween approximating the shape of the object, introducing powdered plastic to fill said space, closing the mold, substantially removing the gas from the space and pressing such powder against rigid mold surfaces of a shape complementary to that of the desired object by applying fluid pressure to the elastic inflatable member to obtain an equally distributed molding pressure everywhere normal to the walls of the object being molded to create a preform of such object, removing the pressure from the preform, separating the preform from the moulding surfaces substantially along the axis of symmetry before the preform has recovered from the pressing load, and sintering the detached preform apart from the pressing apparatus.

2. The method of claim 1 in which the powder is polytetrafluoroethylene.

References Cited in the file of this patent

UNITED STATES PATENTS

| | | |
|---|---|---|
| 1,142,342 | McNeil | June 8, 1915 |
| 1,592,536 | O'Neill | July 13, 1926 |
| 1,863,854 | Jeffery | June 21, 1932 |
| 2,169,280 | Pfanstiehl | Aug. 15, 1939 |
| 2,332,937 | Schmidberger | Oct. 26, 1943 |
| 2,363,107 | Young | Nov. 21, 1944 |
| 2,407,123 | Allison | Sept. 3, 1946 |
| 2,447,434 | Schwarzkopf | Aug. 17, 1948 |
| 2,456,262 | Fields | Dec. 14, 1948 |
| 2,710,991 | Barrington et al. | June 21, 1955 |